Jan. 20, 1959

J. D. DEITZ 2,869,606

COVER FOR TELEPHONE EXCHANGE APPARATUS

Filed Jan. 16, 1957

INVENTOR

Jennings Dennis Deitz

BY

Mason, Fenwick & Lawrence

ATTORNEYS 2,869,606

COVER FOR TELEPHONE EXCHANGE APPARATUS

Jennings Dennis Deitz, South Charleston, W. Va.

Application January 16, 1957, Serial No. 634,543

1 Claim. (Cl. 150—52)

This invention relates to protective covers, and particularly to covers for use with specific telephone exchange equipment.

Since the introduction of dial telephone systems, telephone companies have been faced with a problem in connection with providing protection for the selector and connector banks which select and make connections when numbers are dialed through an exchange. The banks are two-part affairs with the upper part being enclosed and housing the relays which control the selector and connector mechanisms. These banks are subject to rapid wear from accumulated dirt and grit; to short circuits from solder particles falling into them; and, to damage from bumping by employees, tools or cleaning equipment.

Although the need for protective covers for the banks has been realized, a satisfactory cover has not been found previously due to difficulties in connection with insulation, securing the covers in place, viewing covered equipment, and testing equipment while covered.

The principal object of the present invention is to provide covers for selector and connector banks to protect the banks from damage by dirt or foreign particles, or by being struck by tools or other objects.

A more specific object of the invention is to provide a cover of this nature designed to be capable of attachment to the bank without need for attaching means such as bolts, screws, etc.

Another object of the invention is the provision of a cover which will not obscure the view of the operating mechanism of the bank.

Still another object is to provide such a cover which will permit testing of the cover without removal of the cover from the bank.

Other objects of the invention will become apparent from the following description of one practical embodiment thereof when taken in conjunction with the drawings which accompany, and form part of, this specification.

In general, the invention consists of a lightweight, transparent cover of semi-flexible material designed to cover exposed portions of telephone exchange selector and connector banks, and having means for interengagement with parts of said equipment to hold the cover in position.

Figure 1:
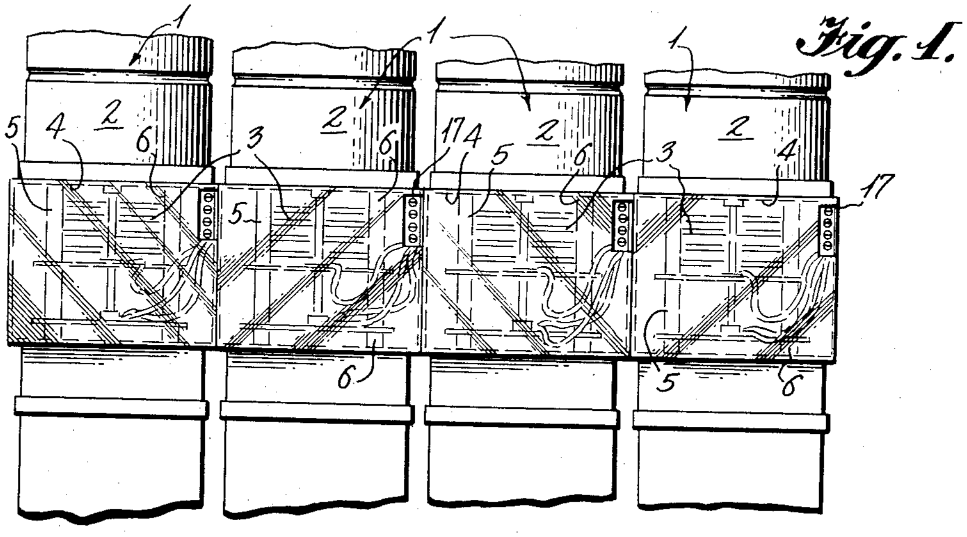
Figure 1 is a side elevation showing, somewhat conventionally, selector or connector banks with covers constructed in accordance with the present invention in place thereon.
Figure 2:
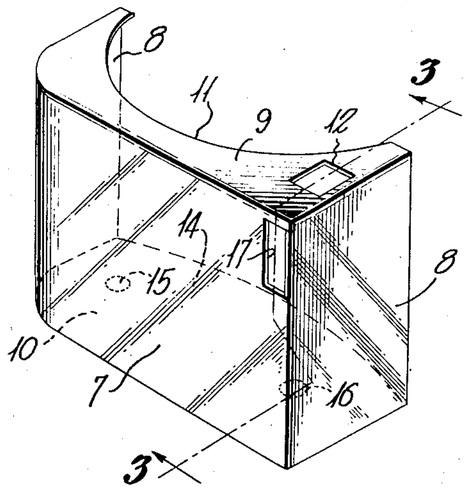
Figure 2 is a perspective view of one of the covers before mounting.
Figure 3:
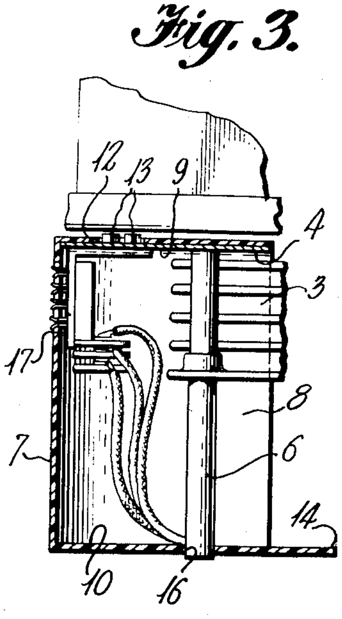
Figure 3 is a vertical section taken on the line 3—3 of Figure 2, illustrating the cover in place on one of the banks.

Referring to the drawings in detail, there is shown in Figure 1 portions of standard selector or connector equipment 1, consisting of a top part 2 which is enclosed and contains the usual relays for controlling the equipment and the bottom parts or banks 3. These two-part units usually are arranged in rows. The two parts of each unit are separated by a thin metal plate 4 which carries two depending anchor bolts 5 and 6. The bank 3, in turn is fastened to these bolts.

Due to the particular arrangement of the units, the back of each bank is protected by the many wires which are connected to the bank and the top is protected by the plate 4. This leaves the two sides, front and bottom open. The cover is designed to protect these open areas.

The cover, as shown, consists of a rectangular front panel 7, two rectangular side panels 8, a top 9 and bottom 10. These combine to form a box-like cover which can be inserted from the front to surround the exposed areas of the bank.

The top panel is of relatively small area due to the concave rear edge 11. The panel is made in this form to permit it to overlie the front and side edges of the plate 4, yet not interfere with parts of the upper mechanism carried by the plate. The top is provided with a rectangular opening 12 which fits over a group of bolts 13 which are on the plate, and permit the top to lie flat on the plate. At the same time, the bolts and opening cooperate to form a locking means to prevent withdrawing the cover without moving the top panel out of its normal plane of rest on the plate 4.

The bottom panel extends beyond the rear edges of the side panels and has its rear edge convex, as at 14. The extended portion of the bottom serves as a shelf to support some of the wires leading to the bank. This serves to lift the wires and prevent them from being caught in cleaning equipment which is used to clean other units which are usually located beneath the selector and connector banks.

The bottom is provided with two openings 15 and 16 arranged to receive the lower ends of the anchor bolts 5 and 6. The holes are of such size that they will fit about the bolt ends with but little play so that the cover will be held against movement when in place.

The cover may be made of any suitable material, but the material used must have some resiliency so that it may be flexed to snap over the bolts 13, 5 and 6. It is desirable, but not necessary, that the material be transparent so that attendants may inspect the bank without removing the cover. Relatively thin, clear or translucent, so-called rigid type plastic has been found well suited to the purpose. This material will give the cover the necessary rigidity and, at the same time, permit some spreading between the top and bottom panels to apply or remove the cover. The front panel may, if desired, be provided with an opening 17 through which parts of the apparatus may be reached for test purpose. One front corner may be rounded to facilitate installation and removal of the cover.

The fabrication of the cover is of little importance, the cover being shown as molded to form. It will be obvious that the cover may be formed of sheet material, cut and folded to shape.

While in the above one practical embodiment of the invention has been disclosed, it will be understood that the detailed structure shown is by way of example and the invention may take other forms within the scope of the appended claim.

What is claimed is:

A cover for apparatus parts employed in telephone exchanges wherein the parts to be protected have a cover plate having an upward projection thereon and the parts are secured by anchor bolts depending from said plate comprising, a box-like structure of resilient shape-retaining material having a rectangular front panel, rectangular side panels, a top panel having a concave rear edge providing an annular ledge to seat upon said plate about the periphery thereof, said top panel having an opening to receive said projection from said plate, and a bottom panel having a convex rear edge providing a shelf projecting rearwardly beyond said side panels, said bottom panel having openings therein to receive the lower ends of said anchor bolts, whereby the top and bottom panels may be flexed to pass over the ends of the projection and the anchor bolts and will snap back when released to surround the projection and bolts to hold the cover in place on the apparatus.

References Cited in the file of this patent

UNITED STATES PATENTS 2,092,110 Doggett ---------------- Sept. 7, 1937
2,658,960 Pearsall ---------------- Nov. 10, 1953
2,705,519 Kaiser ------------------ Apr. 5, 1955